(12) United States Patent
Moody et al.

(10) Patent No.: US 9,243,668 B2
(45) Date of Patent: Jan. 26, 2016

(54) SHAFT BEARING SUPPORT ASSEMBLY FOR WATERBORNE EQUIPMENT

(71) Applicants: Carl Moody, Kenai, AK (US); Gary Hanson, Kenai, AK (US)

(72) Inventors: Carl Moody, Kenai, AK (US); Gary Hanson, Kenai, AK (US)

(*) Notice: Subject to any disclaimer, the term of this patent is extended or adjusted under 35 U.S.C. 154(b) by 94 days.

(21) Appl. No.: 14/021,050

(22) Filed: Sep. 9, 2013

(65) Prior Publication Data

US 2015/0071577 A1 Mar. 12, 2015

(51) Int. Cl.
| | |
|---|---|
| F16C 35/02 | (2006.01) |
| F16C 43/02 | (2006.01) |
| F16C 17/14 | (2006.01) |
| F16C 33/66 | (2006.01) |
| F16C 25/02 | (2006.01) |
| F16C 32/06 | (2006.01) |

(52) U.S. Cl.
CPC .......... *F16C 43/02* (2013.01); *F16C 17/14* (2013.01); *F16C 25/02* (2013.01); *F16C 32/067* (2013.01); *F16C 32/0696* (2013.01)

(58) Field of Classification Search
CPC ........ F16C 17/14; F16C 17/107; F16C 23/04; F16C 25/02; F16C 32/067; F16C 32/0696; F16C 35/02; F16C 43/02; F16C 39/04; F04D 29/106; F16F 29/622
USPC ........... 384/91–92, 95, 97–98, 129–130, 261, 384/264, 267, 274, 287, 291, 110, 192, 271
See application file for complete search history.

(56) References Cited

U.S. PATENT DOCUMENTS

| | | | | |
|---|---|---|---|---|
| 640,059 | A * | 12/1899 | Whitney | 384/569 |
| 2,657,773 | A * | 11/1953 | Driscoll | 188/366 |
| 2,691,059 | A * | 10/1954 | Umina | 174/74 R |
| 3,063,039 | A * | 11/1962 | Taft | 384/100 |
| 3,345,000 | A * | 10/1967 | Hans et al. | 241/209 |
| 3,399,001 | A * | 8/1968 | Whitaker | 384/103 |
| 3,558,238 | A * | 1/1971 | Van Herpt | 415/121.2 |
| 3,674,355 | A * | 7/1972 | Yearout et al. | 384/110 |
| 4,509,160 | A * | 4/1985 | Eggers | 384/121 |
| 4,585,359 | A * | 4/1986 | Kramer | 384/98 |
| 4,710,034 | A * | 12/1987 | Tittizer et al. | 384/279 |
| 4,919,547 | A * | 4/1990 | Schwartzman | 384/124 |
| 5,827,042 | A * | 10/1998 | Ramsay | 415/112 |
| 6,210,103 | B1 * | 4/2001 | Ramsay | 384/110 |
| D460,740 | S * | 7/2002 | Montena | D13/154 |
| 6,439,774 | B1 * | 8/2002 | Knepper et al. | 384/297 |
| 6,695,480 | B1 * | 2/2004 | Ramsay et al. | 384/292 |
| 8,491,334 | B2 * | 7/2013 | Rodrigues | 439/584 |
| 8,740,461 | B2 * | 6/2014 | Bentchev et al. | 384/112 |
| 8,757,890 | B2 * | 6/2014 | Baker et al. | 29/898.09 |
| 2011/0075956 | A1 * | 3/2011 | Wojtkowski, Jr. | 384/276 |

* cited by examiner

*Primary Examiner* — Marcus Charles
(74) *Attorney, Agent, or Firm* — Blank Rome LLP

(57) ABSTRACT

The present invention is directed to a shaft bearing support assembly for waterborne equipment, including: at least one bearing; at least one tapered forcing ring; a housing; and at least one adjusting device. The outer circumference of each of the at least one bearing is surrounded by one tapered forcing ring which is arranged inside the housing. The at least one adjusting device communicates with each of the at least one tapered forcing ring. A force generated by the at least one adjusting device is transmitted to the at least one tapered forcing ring to longitudinally move the at least one tapered forcing ring, causing the at least one bearing to constrict radially and to adapt to a desired clearance over a diameter of a shaft.

19 Claims, 8 Drawing Sheets

SHAFT BEARING SUPPORT ASSEMBLY FOR WATERBORNE EQUIPMENT

FIELD OF THE INVENTION

The invention relates to a shaft bearing support assembly for waterborne equipment, such as a vessel, a pump or a turbine. The invention allows for adjustment of the diameter of the bearing to optimize clearance over the shaft.

BACKGROUND OF THE INVENTION

Shaft and/or bearing damage or failure in waterborne equipment causes economic losses. Historically, replacing marine shaft bearings is a very costly endeavor. A ship has to be dry docked, and the propeller shaft or rudder shaft has to be removed before the bearings can be replaced. The cost of repair can exceed 1 million US dollars on a large vessel.

In 2001, a cruise ship owned by Celebrity Cruises was sidelined due to a propeller shaft bearing failure. The cruise ship was equipped with pod propulsion systems. Two large bearings, approximately 2½ feet in diameter, carried the propeller shaft in each pod. The ship had to be dry-docked for two weeks to replace a bearing in the port side pod.

Because of the enormous repair costs and economic losses caused by a damaged bearing, features of the present invention can be seen variously to provide an adjustable and durable shaft bearing support assembly for waterborne equipment, such as a vessel, a pump or a turbine.

SUMMARY OF THE INVENTION

This invention is directed to a shaft bearing support assembly for waterborne equipment, comprising: at least one bearing; at least one tapered forcing ring; a housing; and at least one adjusting device, wherein the outer circumference of each of the at least one bearing is surrounded by one tapered forcing ring which is arranged inside the housing, further wherein the at least one adjusting device communicates with each of the at least one tapered forcing ring, and further wherein a force generated by the at least one adjusting device is transmitted to the at least one tapered forcing ring to longitudinally move the at least one tapered forcing ring, causing the at least one bearing to move constrict radially and to adapt to a desired clearance over a diameter of a shaft.

This invention is also directed to a method for adjusting a clearance of a shaft bearing support assembly over a shaft, comprising the steps of: activating at least one adjusting device communicated with at least one tapered forcing ring; transmitting a force generated by the at least one adjusting device to the at least one tapered forcing ring to longitudinally move the at least one tapered forcing ring; and causing at least one bearing to constrict radially and to adapt to a desired clearance over a diameter of a shaft, wherein the outer circumference of each of the at least one bearing is surrounded by one tapered forcing ring which is arranged inside a housing.

The invention allows a waterborne equipment operator to adjust the diameter of the shaft bearing without dry docking the equipment. When the equipment is a ship, the invention allows the ship operator to remotely adjust the shaft bearing from inside the ship with a hydraulic or mechanical device that communicates with the shaft bearing support assembly so that the force generated is transmitted to the tapered forcing right and the bearing thus adjusting the bearing to better conform to the shaft. By such adjustments, shaft to bearing clearance is adjusted in accordance with the wear and tear of the equipment on an as needed basis.

BRIEF DESCRIPTION OF THE DRAWINGS

This invention is explained in greater detail below with reference to the embodiments which are illustrated in the accompanying drawings.

DETAILED DESCRIPTION OF THE PREFERRED EMBODIMENTS

Figure 1:
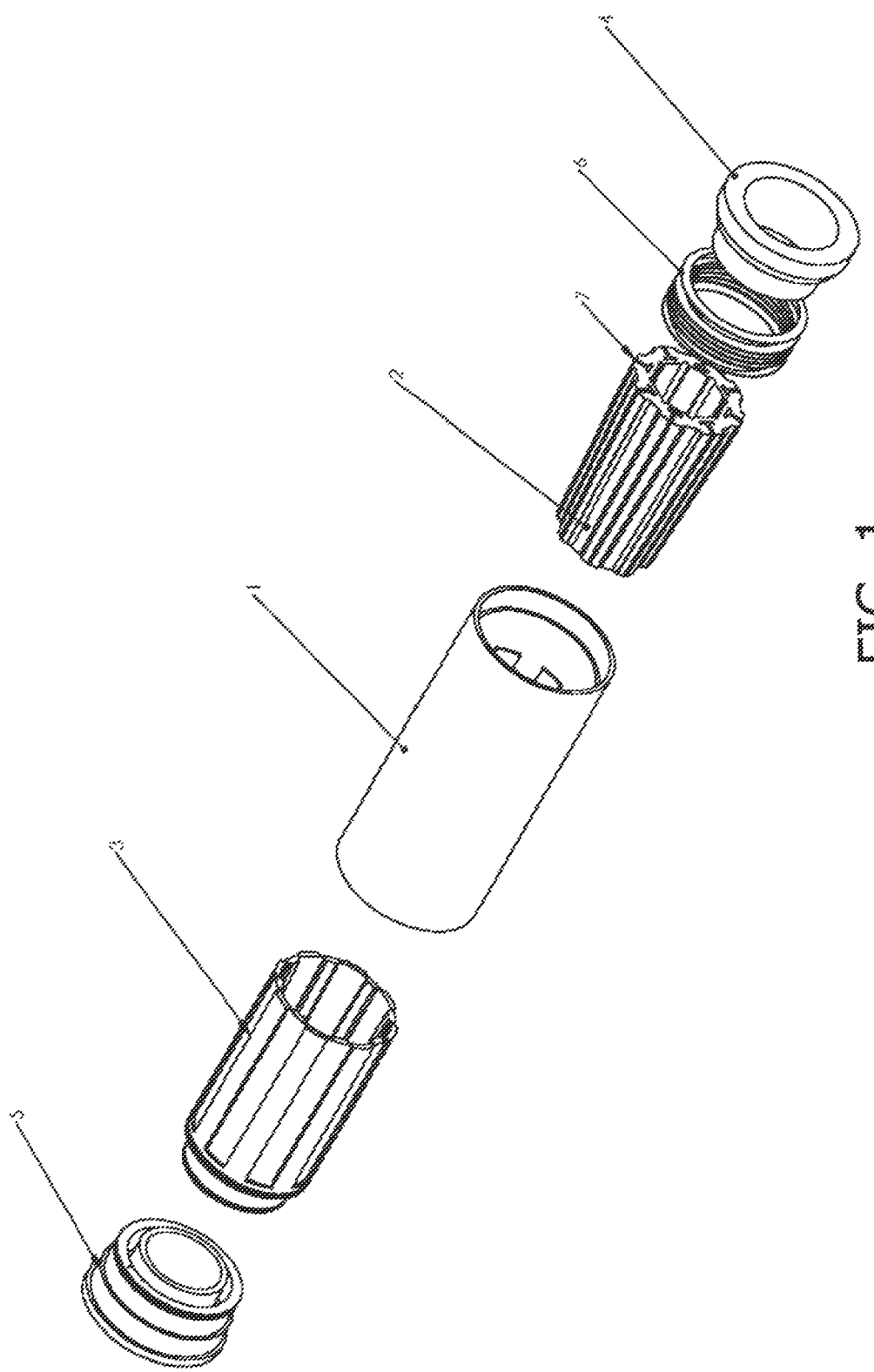
FIG. 1 is an exploded view of a shaft bearing support assembly.

FIG. 1 illustrates a shaft bearing support assembly according to one embodiment of this invention. The shaft bearing assembly comprises a bearing 2 whose outer circumference is surrounded by a tapered forcing ring 3, which in turn is assembled into a housing 1. At one end of the assembly, a pressure cap 5 is provided. At the other end of the assembly, the bearing 2 is in contact with compression springs 6 and is encapsulated with a seal cap 4. Sealing devices may be needed at either end of the assembly to keep silt or debris from entering the bearing.

Figure 2:
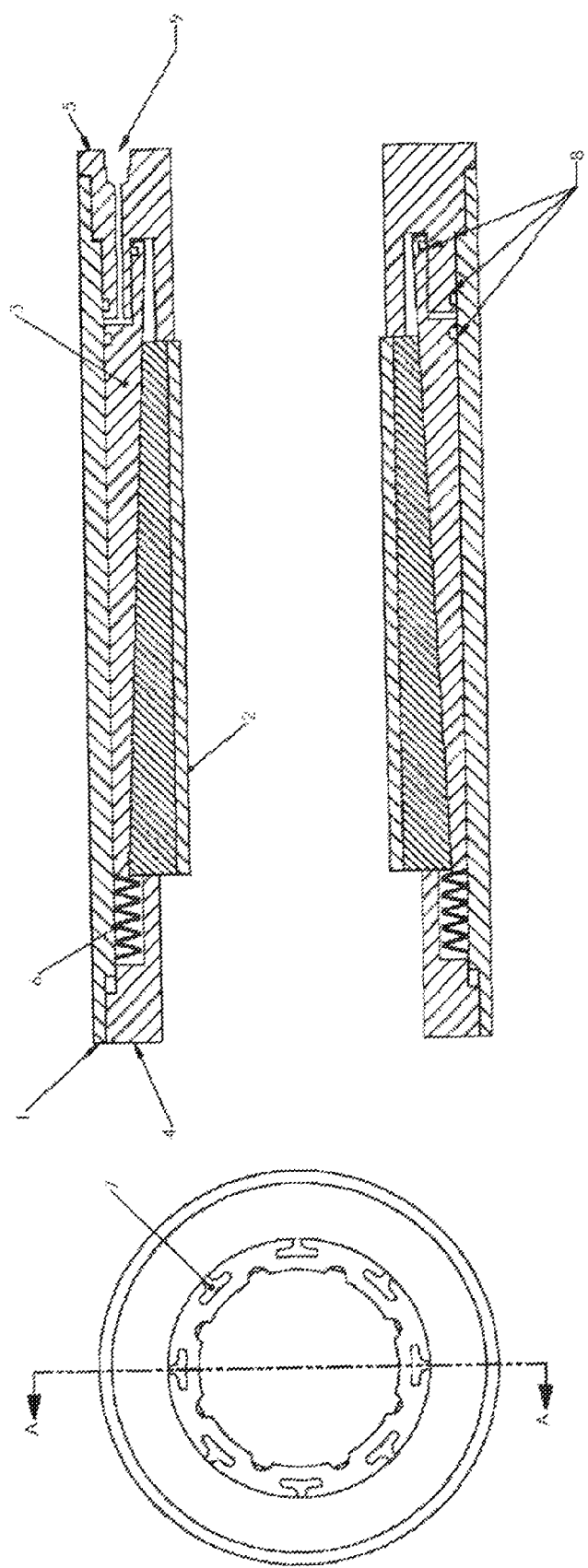
FIG. 2 is a sectional view of a shaft bearing support assembly.

An adjusting device, such as a hydraulic device, communicates with the shaft bearing support assembly of FIG. 1. In FIG. 2, the hydraulic medium is communicated with the tapered forcing ring 3 via tubing through a port 9. Upon the force of the hydraulic device, the tapered forcing ring 3 is forced in a longitudinal direction towards the compression springs 6. The longitudinal move of the tapered forcing ring 3 then causes the bearing 2 to constrict radially and to adapt to a desired clearance over a diameter of a shaft. Seal grooves 8 house sealing means to maintain the hydraulic pressure. The bearing 2 can be loosened by the operation of the compression springs 6 and/or hydraulics (not shown) for back-adjustment of the tapered forcing ring 3. Thus, the bearing is adjusted to adapt to a desired clearance over a diameter of a shaft. The cross sectional view shows the spines 7 in the bearing 2. Spines 7 are optional and give structural support to the bearing 2, as such spines may be vulcanized into the bearing material. The tapered outer circumference of the forcing ring 3 when moved enables the adjustment of the pressure on the bearing 2 and thus provides tightened or loosened clearance over the shaft.

Figure 3:
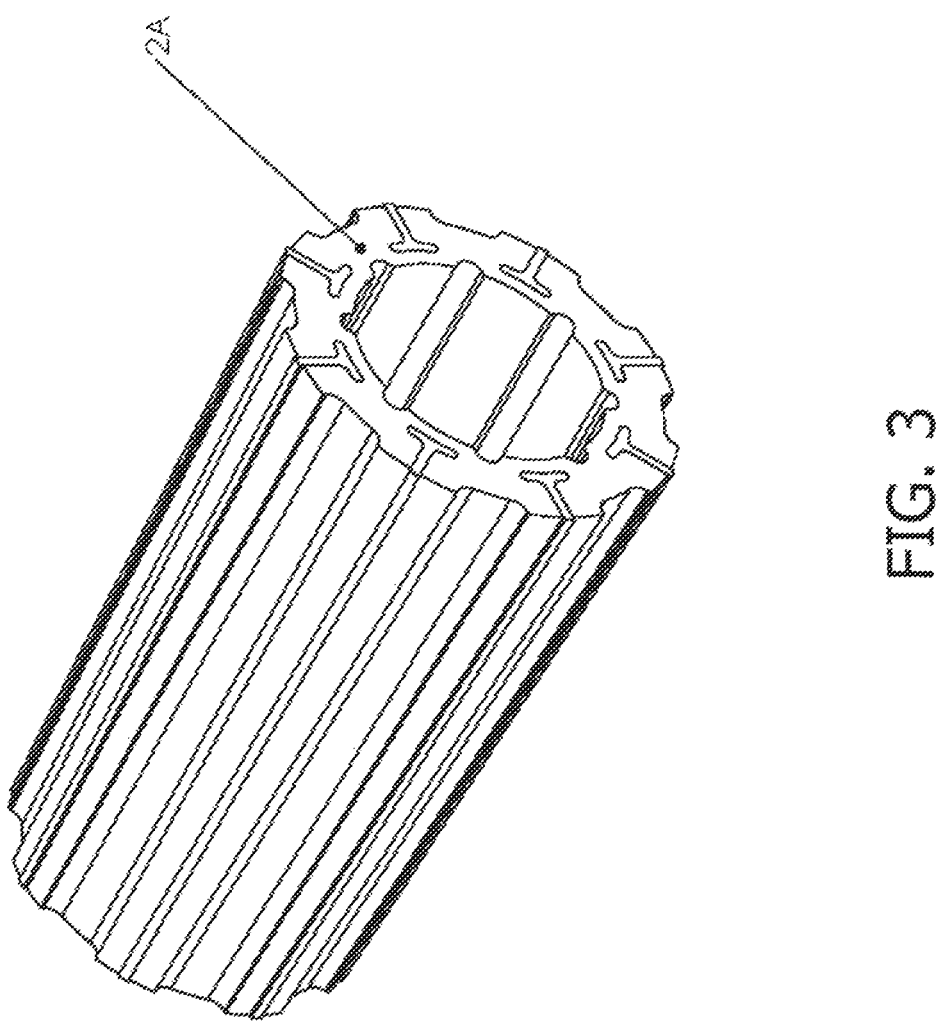
FIG. 3 is a stave type bearing with spines.

Any bearings that are appropriate need first to be durable. Elastic or multiple stave type that possess the elasticity or flexibility for adjustment in diameter can be implemented. A bearing with a tapered outer circumference is preferred. A sleeve or stave-type bearing is typically used. In FIG. 3 is shown 2A, a preferred tapered stave bearing with spines. Examples of the bearing include Cutlass bearings, multi-stave bearing or other bearings constructed of an elastic polymer such as nitrile rubber, a polymer, or a polymer composite so that the material is durable and conforms to the compressive effects of the tapered forcing ring to allow for consistent radial adjustments.

The forcing ring is made of a rigid material with substantial compressive strength to overcome the bearing material and corrosion. Examples of a rigid material include a metallic material. A forcing ring with a tapered inner diameter is preferred.

Figure 4:
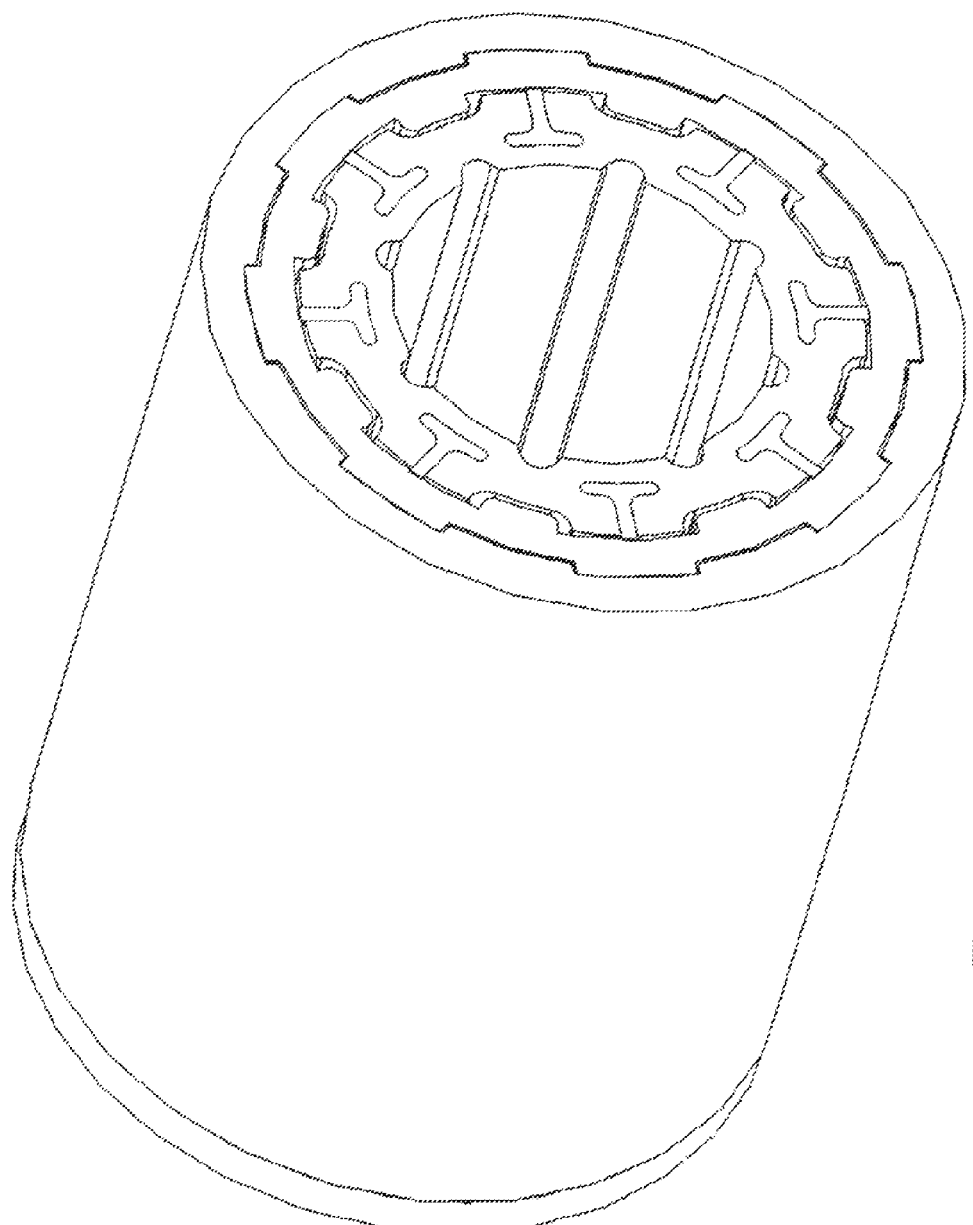
FIG. 4 is a sectional view of a shaft bearing support assembly.

FIG. 4 is a shaft bearing assembly with a bearing and a tapered forcing ring in a housing.

Figure 5:
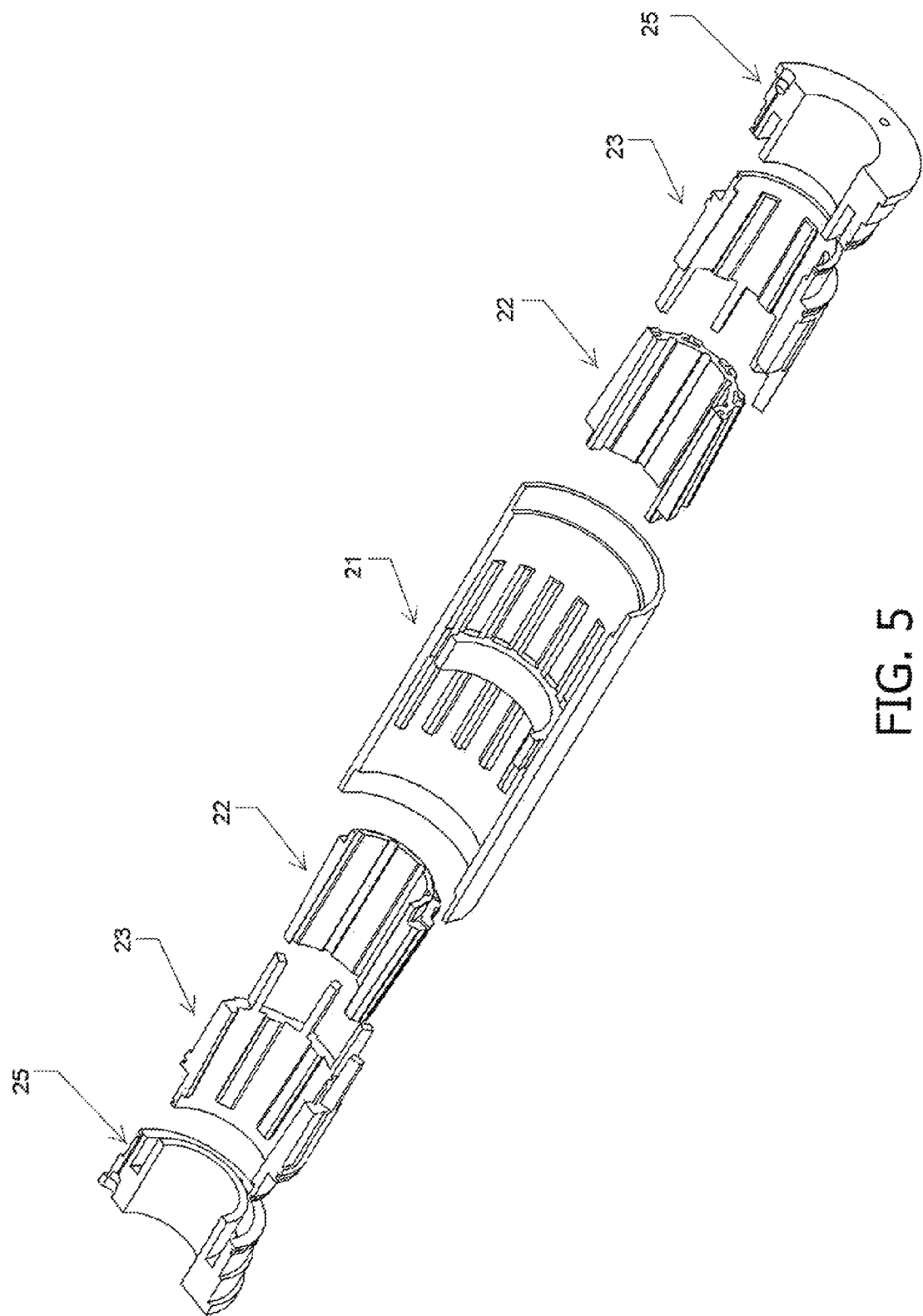
FIG. 5 is an exploded sectional view of a shaft bearing support assembly with double bearings.
Figure 6:
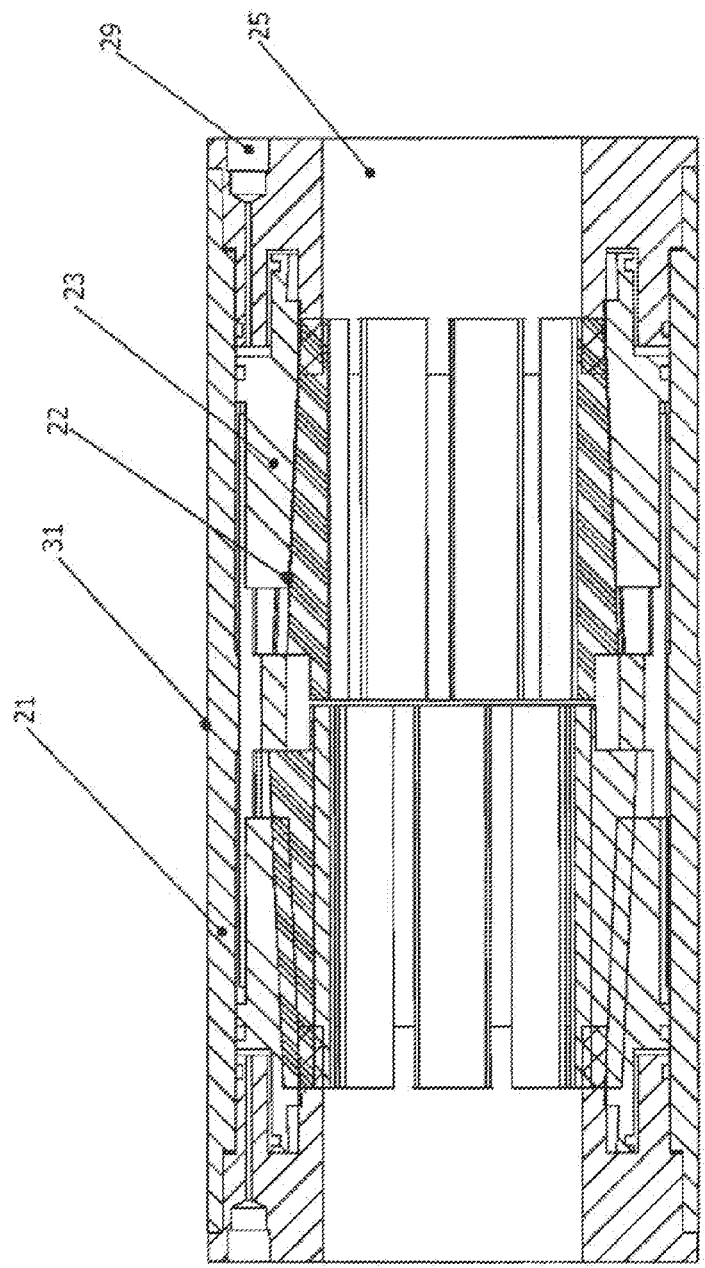
FIG. 6 is a sectional view of a double bearings shaft support assembly.

Another embodiment of the invention is shown in FIG. 5. In this embodiment, two bearings 22 are arrangement longitudinally, the outer circumference of each surrounded by a tapered forcing ring 23 whose outer circumference is arranged inside a housing 21. A sectional view of the double bearings support assembly (FIG. 6) shows that each pair of the tapered forcing ring 23 and the bearing 22 can be adjusted individually via a hydraulic line introduced through a port 29 in the pressure cap 25 at a distal end of the tapered forcing ring 23. The pair of forcing ring 23 and bearing 22 can also be adjusted manually, for example via bolts in port 30 in the pressure cap 25. Although not shown, a set of hydraulic lines can be introduced to the proximal end of each of the forcing rings 23 via a port 31 in the housing 21 to enable back-adjustment of the forcing ring, in the event that loosening of the bearing is necessary. The back-adjustment can also be accomplished using the bolts in port 30. Adjusting devices contemplated include manual, mechanical and hydraulic devices. More than one device may be used at a time and each may be used as a backup to another.

Figure 7:
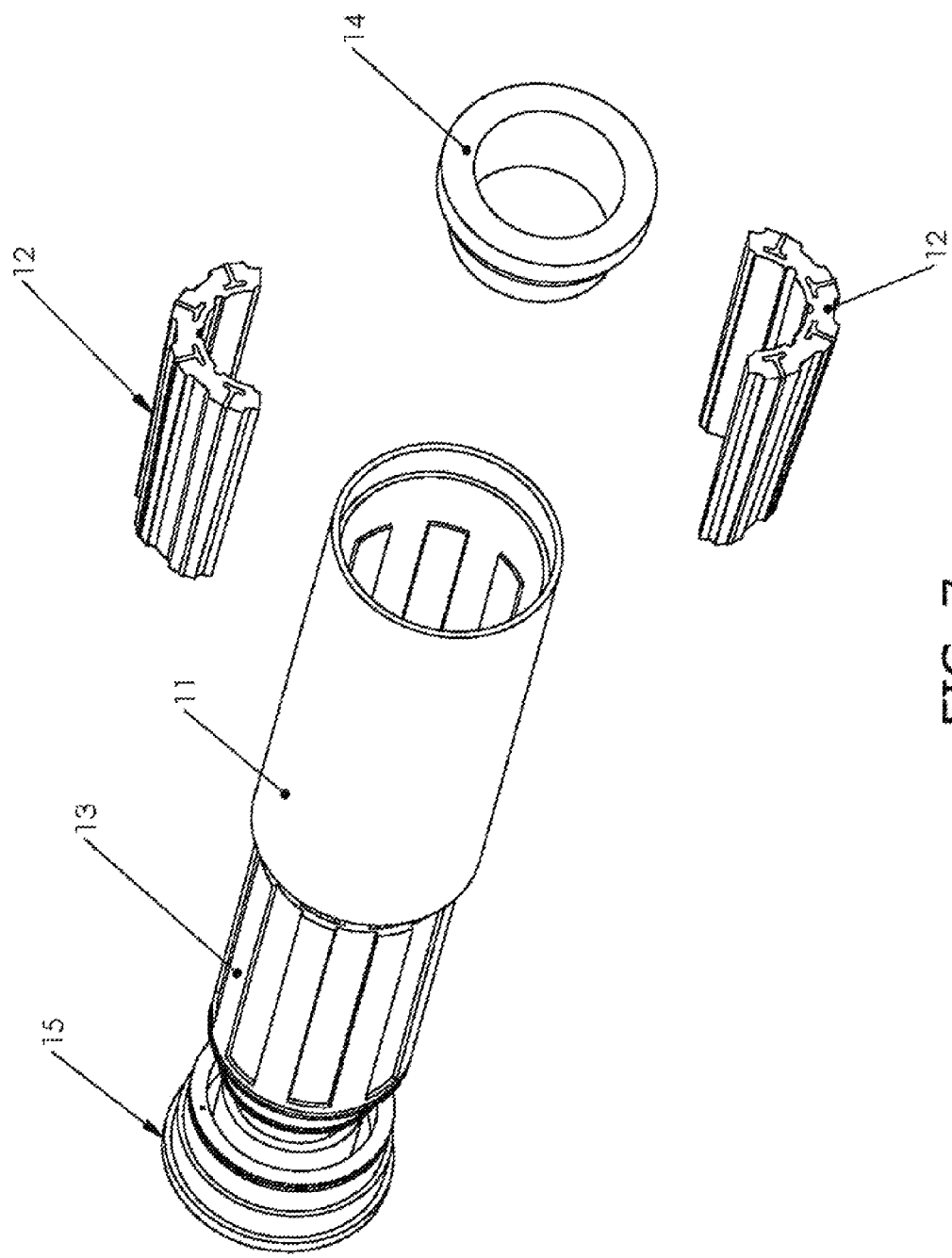
FIG. 7 is a shaft support assembly employing a two-piece split bearing.

Another embodiment of the invention is illustrated in FIG. 7. A two-piece split bearing 12 is used here to further facilitate bearing replacement without the removal of the shaft. The shaft supporting assembly can be adjusted with the bearing 12 and the forcing ring 13 in place using any of the adjusting devices described above. In case the two-piece split bearing 12 needs to be replaced, removing the seal cap 14 and the pressure cap 15 provides ready access to the two-piece split bearing 12. Thus, replacing the two-piece split bearing 12 can be performed without dry docking the vessel. Other multi-piece bearings can also be employed to expedite bearing replacement.

Figure 8:
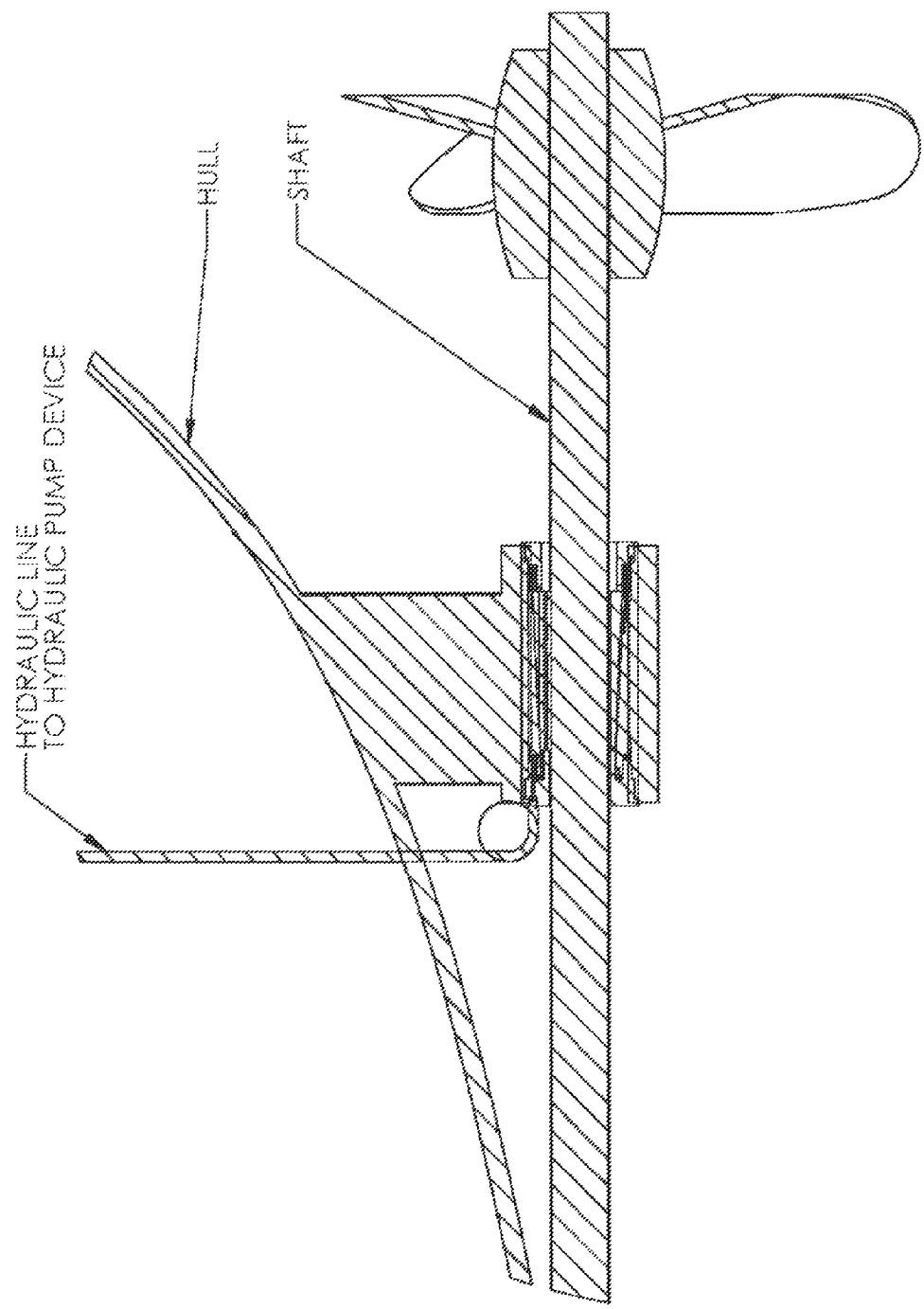
FIG. 8 is a view of a shaft bearing support assembly mounted at the hull of a ship.

Using the invention, if the ship operator detects signs of shaft or bearing wear and tear, such as shaft vibration, he can adjust the clearance of the shaft bearing support assembly over the shaft by operating the adjusting device, for example, from inside the ship using a hydraulic pump as shown in FIG. 8. The hydraulic pressure forces the forcing ring and thus the bearing to conform to the diameter of the shaft. Alternatively, the adjustment can be performed by adjusting the bolts located in the seal cap or pressure cap of the assembly.

In general, a ship operator adjusts the clearance of the shaft bearing support assembly over the shaft by activating at least one adjusting device that communicates with at least one tapered forcing ring, transmitting a force generated by the at least one adjusting device to the at least one tapered forcing ring to longitudinally move the at least one tapered forcing ring, and causing the at least one bearing to constrict radially and to adapt to a desired clearance over a diameter of a shaft.

When hydraulic devices are used, the hydraulic forces are transmitted to the tapered forcing rings via tubing. Ports in the pressure cap, seal cap, or housing allow the hydraulic forces to act on the tapered forcing rings. In the event loosening is necessary, the same steps can be repeated using the proper hydraulic devices that communicate with the proper end of the tapered forcing ring. Using the current method, bearings are capable of reacting to the longitudinal movements of the forcing ring by either constricting or relaxing around the shaft. Loosening can also be performed by adjusting a mechanical device, such as bolts in the pressure or seal cap.

When a single bearing assembly is used, the operator activates a hydraulic device that communicates with the tapered forcing ring, transmits the hydraulic force to the tapered forcing ring to longitudinally move the tapered forcing ring, and thus causes the bearing to constrict radially and to adapt to a desired clearance over a diameter of a shaft. Back-adjustment if necessary can be performed using either a hydraulic device or a mechanical device. The single bearing assembly may contain compressions rings abutting the tapered forcing ring. Such compression rings may serve as a mechanical device to limit or to back-adjust the tapered forcing ring's longitudinally movement. By activating a hydraulic device that communicates with a different end of the tapered forcing ring, the operator moves the tapered forcing ring longitudinally in an opposite direction and thus causes the bearing to relax radially. The bearing is loosened over the shaft. Bolts in the pressure or seal cap may also be used to complement the hydraulic device for adjustment.

When a double bearings assembly is used, the operator activates the hydraulic devices that communicate with either or both of the tapered forcing rings, transmits the hydraulic force to the target tapered forcing ring(s) to longitudinally move the tapered forcing ring(s), and thus causes the target bearing(s) to constrict radially and to adapt to a desired clearance over a diameter of a shaft. Back-adjustment if necessary can be performed using either a hydraulic device or a mechanical device. The hydraulic device used for back-adjustment communicates with the tapered forcing rings in the proximal end located near the center of the housing via a port. Similar to a single bearing assembly, bolts located in the pressure or seal cap is an example of a mechanical device used for adjusting shaft clearance. The double bearings assembly allows the operator to adjust one or both of the bearings, depending on the location of the wear and tear.

A diver may need to be deployed to check the clearance prior to and during the adjustment. The diver may adjust the bearing on site with a hydraulic hand pump if desired. A port or "zirk" can be provided for the diver. The cost of repair essentially stems only from the labor of the diver and the ship operator who are typically being compensated regardless of the repair. The downtime on the ship is hours rather than weeks, thereby avoiding lost revenue. Using the current invention, shaft repair can be performed at essentially no added cost rather than at the high costs for dry-docking, disassembling and reassembling the shaft and bearing.

Ship operators can adjust the bearing repeatedly on an as needed basis to prolong the lifetime of the bearings. In the event the bearing needs to be replaced, a ship operator can replace the bearing without the removal of the shaft when a multi-piece bearing is used.

The current invention significantly cuts down the cost associated with bearing repair in waterborne craft. Up to one million US dollars can be saved from each dry-docking and repair event. Applicants estimate that at least two dry-docking events can be avoided in the lifetime of a bearing thus saving at least two million US dollars. In addition, lost revenues of up to three million US dollars can be avoided from 30 days of non-service at 100 thousand dollars of lost revenue each day.

The current invention is not limited to the described specific embodiments. A skilled artisan will readily appreciate that many modifications and variations are possible in the exemplary embodiments without departing from the inventive concept. For example, instead of having one shaft bearing support assembly for each shaft, a multitude of shaft bearing support assembly may be installed. Furthermore, it is understood that parts of the assembly can be made of composite- or light material, such as coal fiber, when it is suitable. Bearing surfaces and surfaces exposed to erosion are suitably provided with preventive coating, for example, by polyurethane. Naturally, combination of above mentioned materials or of other materials, may be used. The above-described bearings may be water-lubricated, either from the environment or possibly forcing "filtered" water into the bearing to reduce wearing from contaminates.

The application of the current invention is not limited to waterborne vessels. The adjustable shaft bearing support assembly can readily be applied in other waterborne equipment, such as industrial pumps and water turbines.

Accordingly, all such modifications are intended to be included within the scope of this invention as defined in the following claims.

What is claimed is:

1. A shaft bearing support assembly for waterborne equipment, comprising:
    at least one bearing;
    at least one tapered forcing ring;
    a housing; and
    at least one adjusting device,
    wherein an outer circumference of each of the at least one bearing is surrounded by the at least one tapered forcing ring which is arranged inside the housing,
    further wherein the at least one adjusting device communicates with each of the at least one tapered forcing ring, and
    further wherein a force generated by the at least one adjusting device is transmitted to the at least one tapered forcing ring to longitudinally move the at least one tapered forcing ring, causing the at least one bearing to move radially and to adapt to a desired clearance over a diameter of a shaft.

2. The shaft bearing support assembly of claim 1, wherein the at least one bearing is tapered.

3. The shaft bearing support assembly of claim 2, further comprising:
    at least one compression spring, wherein the at least one compression spring abuts the at least one tapered forcing ring.

4. The shaft bearing support assembly of claim 2, further comprising:
    at least one pressure cap attached to at least one end of the housing.

5. The shaft bearing support assembly of claim 4, comprising:
    a pressure cap attached to one end of the housing;
    further comprising:
    a seal cap attached to a remaining end of the housing.

6. The shaft bearing support assembly of claim 4, wherein the at least one adjusting device is at least one hydraulic device, or at least one mechanical device.

7. The shaft bearing support assembly of claim 6, wherein the force is generated by at least one hydraulic device, and is transmitted to the at least one tapered forcing ring through a port.

8. The shaft bearing support assembly of claim 7, wherein the bearing comprises a bearing with spines.

9. The shaft bearing support assembly of claim 7, wherein the shaft bearing support assembly is mounted onboard of a hull of a waterborne craft.

10. The shaft bearing support system of claim 6, wherein the bearing is a split multi-piece bearing.

11. The shaft bearing support system of claim 10, wherein the split multi-piece bearing is a split two-piece bearing.

12. The shaft bearing support system of claim 2, comprising:
    two bearings; and
    two tapered forcing rings,
    wherein the two bearings are arranged longitudinally.

13. The shaft bearing support assembly of claim 12, wherein the force is generated by the at least one hydraulic device, and is transmitted through at least one port to a proximal end and a distal end of the two tapered forcing rings.

14. The shaft bearing support assembly of claim 13, further comprising two pressure caps, one attached to each end of the housing.

15. A method for adjusting a clearance of a shaft bearing support assembly over a shaft, comprising the steps of:
    activating at least one adjusting device communicated with at least one tapered forcing ring;
    transmitting a force generated by the at least one adjusting device to the at least one tapered forcing ring to longitudinally move the at least one tapered forcing ring; and
    causing at least one bearing to move radially and to adapt to a desired clearance over a diameter of a shaft,
    wherein an outer circumference of each of the at least one bearing is surrounded by one tapered forcing ring which is arranged inside a housing.

16. The method for adjusting a clearance of a shaft bearing support assembly over a shaft of claim 15, wherein the at least one adjusting device is at least one hydraulic device or at least one mechanical device.

17. The method for adjusting a clearance of a shaft bearing support assembly over a shaft of claim 16, wherein the at least one adjusting device is at least one hydraulic device.

18. The method for adjusting a clearance of a shaft bearing support assembly over a shaft of claim 17, comprising the steps of:
    activating the at least one hydraulic device communicated with a tapered forcing ring;
    transmitting the force generated by the at least one hydraulic device to a tapered forcing ring to longitudinally move the tapered forcing ring against at least one abutting compression spring; and
    causing a bearing to react radially and to adapt to a desired clearance over a diameter of a shaft.

19. The method for adjusting a clearance of a shaft bearing support assembly over a shaft of claim 17, comprising the steps of:
    activating the at least one hydraulic device communicated with at least one of two tapered forcing rings;
    transmitting the force generated by the at least one hydraulic device to at least one of the two tapered forcing rings to longitudinally move the at least one of the tapered forcing rings; and
    causing at least one of the two bearings to react radially and to adapt to a desired clearance over a diameter of a shaft, wherein the two bearings are arranged longitudinally.

* * * * *